UNITED STATES PATENT OFFICE.

AUGUST CASIMIR SCHWARTING, OF BREMEN, GERMANY, ASSIGNOR TO REIS- & HANDELS-AKTIENGESELLSCHAFT, OF BREMEN, GERMANY.

LINOLEUM, LINCRUSTA, OR LIKE MATERIAL.

1,079,728. Specification of Letters Patent. Patented Nov. 25, 1913.

No Drawing. Application filed December 13, 1911. Serial No. 665,532.

*To all whom it may concern:*

Be it known that I, AUGUST CASIMIR SCHWARTING, manager, a subject of the German Emperor, residing at Bremen, Germany, have invented certain new and useful Improvements in Linoleum, Lincrusta, or like Material, of which the following is a specification.

This invention consists in rice husks in a ground or pulverized condition being employed as a substitute for powdered cork or wood for making linoleum, lincrusta and the like.

As applicant has found by a large series of experiments, ground rice husks are specially adapted above all other substances for replacing ground cork or wood in linoleum and the like material. By using ground rice husks, a perfectly dense, continuous surface, free from pores and as smooth as a mirror is obtained for the linoleum, to which, in contrast to ordinary linoleum material, not the smallest particle of dust can adhere. A further advantage is the extraordinary cheapness of linoleum made with ground rice husks. Ground rice husks permit in mixing the linoleum material of the linoleum cement (the latter being a binding medium for the linoleum consisting of oxidized linseed oil or the like, sometimes mixed with gum or other suitable adhesive substances) being reduced by more than 50% without the well known good properties of the product being substantially affected.

Linoleum or lincrusta has hitherto been made by mixing ground cork or wood with linoleum cement and coloring matters in the mixing machines usually employed for this purpose in somewhat the following suitable proportionate quantities:

25 kilograms of ground cork or wood,
22–23 " " linoleum cement,
14 " " dyes or coloring matters.

As will be seen, the expensive linoleum cement here constitutes a principal constituent of the linoleum. When ground rice husks are used instead of ground cork or wood, the proportions of mixture which give the best result are, on the other hand, as follows:—

25 kilograms of ground rice husks,
7–8 " " linoleum cement,
8 " " coloring matter.

As in this case the quantity of the dark colored linoleum cement is considerably smaller than hitherto, a considerably smaller quantity of coloring substances are also required in order to obtain the same shade of color, as may be seen.

The ground rice husks are very tough and absorb less moisture and grease. This latter property is particularly advantageous, because the grease is not absorbed by the ground material itself but remains in and as the adhesive or binding material. This is also the reason for the smaller consumption of linoleum cement.

The sheet of linoleum rolled from the improved material is scarcely heavier than before, and the quantity of finished material obtained is not less than previously.

In spite of less linoleum cement and coloring matters being employed, the improved material, in consequence of the properties of the ground rice husks, is quite as effective as that previously made, and is also considerably cheaper. The improved linoleum is not easily destroyed and may last 20 years without alteration. As rice husks are of the nature of talc, the machines in the mixing process run more easily than with the ground cork and wood hitherto employed.

Of course there is no objection to the replacement of the ground cork or wood by ground rice husks being only a partial one, or to all three materials being used simultaneously.

Having now particularly described and ascertained the nature of my said invention and in what manner the same is to be performed, I declare that what I claim is:—

The herein described linoleum composition comprising essentially pulverized rice husks and linoleum cement.

In testimony whereof I affix my signature in presence of two witnesses.

AUGUST CASIMIR SCHWARTING.

Witnesses:
FREDERICK HOYERMANN,
WILHELM STRUP.